Jan. 14, 1969     E. W. CHABOT     3,421,212
METHOD OF PRODUCING COMMUTATOR LEAD CONNECTION
Filed Feb. 12, 1965
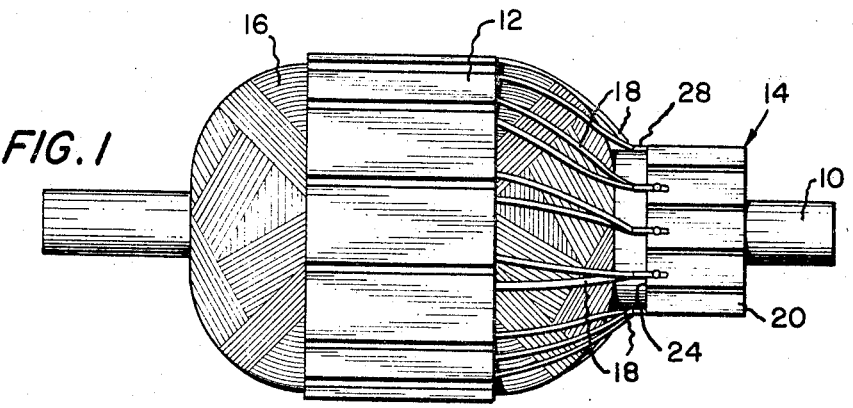
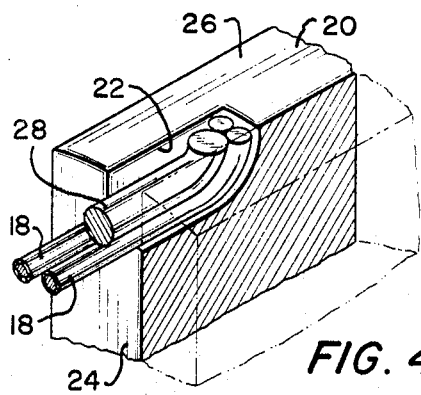
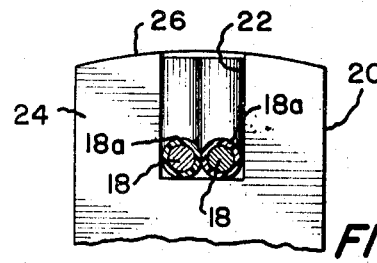
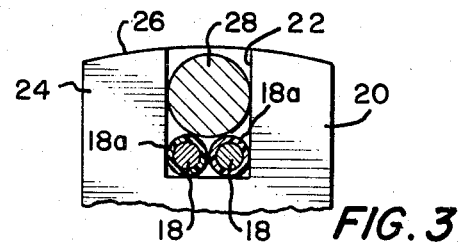
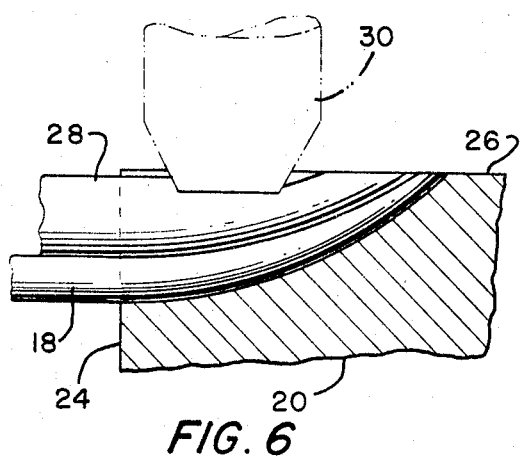
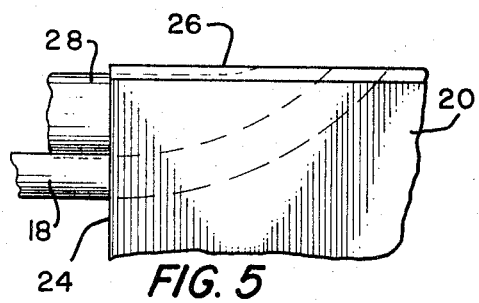
INVENTOR.
EDWARD W. CHABOT
BY
David W. Tillotson
ATTORNEY United States Patent Office 3,421,212
Patented Jan. 14, 1969

3,421,212
METHOD OF PRODUCING COMMUTATOR
LEAD CONNECTION
Edward W. Chabot, Greenfield, Mass., assignor to Millers
Falls Company, Greenfield, Mass., a corporation of
Massachusetts
Filed Feb. 12, 1965, Ser. No. 432,333
U.S. Cl. 29—628                                     8 Claims
Int. Cl. H01r 43/02

ABSTRACT OF THE DISCLOSURE

A method of securing electrical leads to a commutator, comprising the steps of inserting a pair of insulated electrical leads into a commutator slot, inserting an uninsulated copper wire into the slot over the insulated electrical leads, and applying a heated tool to the copper wire until the insulation on the electrical leads is broken and a good electrical and mechanical connection is formed between the electrical leads and the commutator.

This invention relates to electric motors and the like and has particular reference to the provision of a new and improved method of securing armature coil leads to the commutator of an electric motor.

Conventionally, the armature coil leads of an electric motor are secured to the motor commutator either by stripping the insulation from the leads and soldering them into slots formed in the commutator or, alternatively, by inserting the leads into the commutator slots and deforming the walls of the slots around the leads through the use of a highly heated tool such as, for example, a spinning, fusing or hot staking tool. Both of these conventional methods, however, have been found to be undesirable and to suffer from many serious disadvantages and deficiencies.

For instance, the former of these methods requires the employment of a complicated and time-consuming procedure which includes stripping the electrical insulation from the leads and soldering the leads to the commutator. This method, it will be seen, is expensive in operation and includes the inherent risk of damage or breakage of the electrical leads. The latter of these methods, while being more economical in practice, has been found to produce an undesirably large quantity of high resistance connections and to frequently result in injury to the electrical leads. Furthermore, such a high concentration of heat is required for the removal of insulation from the magnet wire and deformation of the commutator that the connection thereby produced is inherently weakened both electrically and mechanically during its formation.

An object of the present invention is to provide a new and improved method of securing the armature coil leads of an electric motor to the motor commutator in a connection that is both mechanically and electrically strong and durable.

Another object of the invention is to provide a new and improved method of the type set forth which substantially reduces the possibilities of potential injury and mechanical breakage of the armature coil leads.

Another object is to provide a new and improved method of the type set forth which requires only a minimum concentration of heat for connecting the armature coil leads with the motor commutator and produces an improved electrical connection having high mechanical strength.

Another object is to provide a new and improved method of the type set forth which produces a minimum quantity of high resistance connections.

Another object is to provide a new and improved method of the type set forth which does not require prior removal of the insulation from the leads and which removes the external insulation from the armature coil leads simultaneously with the forming of the connection.

Another object is to provide a new and improved method of the type set forth which is relatively simple and economical in practice.

Another object is to provide a new and improved method of the type set forth which produces a connection which is particularly adapted to facilitate the electrical flow through the connected members.

Other objects and advantages of the invention will be apparent from the following description taken in connection with the accompanying drawings. It will be understood that changes may be made in the details of construction and arrangement of parts shown and described as the preferred form of the invention has been given by way of illustration only.

Referring to the drawings:

FIG. 1 is an external, elevational view of a motor armature-commutator assembly including a connection produced in accordance with the present invention;

FIG. 2 is an enlarged, fragmentary end view of one of the bars of the commutator shown in FIG. 1 with two armature coil leads therein;

FIG. 3 is a fragmentary end view of the commutator bar shown in FIG. 2 with the conductive wire therein;

FIG. 4 is a perspective view, partially broken away for the purpose of illustration, of the commutator bar as illustrated in FIG. 3;

FIG. 5 is a side view of the commutator bar as shown in FIGS. 3 and 4; and

FIG. 6 is a partially sectional side view of the commutator bar as illustrated in FIGS. 3, 4, and 5 in accordance with the tool employed to form the connection.

Referring more particularly to the drawings wherein similar reference characters are used to designate corresponding parts throughout the several views, FIG. 1 illustrates a motor armature-commutator assembly comprising a shaft 10 which is adapted to be mounted for rotary movement, a rotor 12 which is carried by the shaft 10 for rotation therewith, and a commutator indicated generally at 14 which is also secured to the shaft 10 for rotation therewith. The rotor 12 is provided with a plurality of armature coils 16, each of which includes a pair of extending electrical leads 18 which are surrounded by an insulating covering 18a throughout their length. The electrical leads 18 are adapted for connection to the commutator 14 and electrically connect the commutator 14 with the armature coils 16.

The commutator 14 includes a plurality of commutator bars 20 which are circumferentially disposed around the shaft 10. As will be seen from FIGS. 2 through 4, each of the commutator bars 20 includes a slot 22 which communicates between the rear surface 24 and the face 26 of the commutator bars 20. The slot 22 in each of the commutator bars 20 is substantially the combined width of two of the electrical leads 18 and is adapted to receive two of the leads 18 in horizontal alignment during the electrical connection of the armature coils 16 with the commutator 14.

A single, heavy-gauge, preferably uninsulated, wire lead 28 formed of copper or similar conductive material is disposed in each of the slots 22 upon the pair of electrical leads 18 therein. Each of the conductive leads 28 is formed of a diameter substantially equivalent to the total width of the two horizontally aligned electrical leads 18 and is trimmed in length immediately external to its entrance into the slots 22.

The electrical connection between the electrical leads 18 of the armature coils 16 and the commutator bars 20 is formed by the application of a heated tool 30, such as a hot staking or a fusing tool, to each of the conductive leads 28 and the commutator slot 20. The heat, thus received by the conductive leads 28 and the conductive material of commutator bar 20 immediately surrounding the slots 22, is retransmitted thereby to the adjacent underlying electrical leads 18 to thereby strip the insulating covering 18a from the portions of the electrical leads 18 within the slots 22 and to form a mechanical and electrical connection between the commutator bars 20, the conductive leads 28, and the underlying electrical leads 18. During the operation of the motor including this connection, the conductive leads 28 function as a heat sink to facilitate the flow of operating current through the electrical leads 18.

The method which is provided by the present invention for securing the electrical leads 18 of the armature coils 16 to the commutator bars 20, in summary, comprises the following steps. First, as shown in FIG. 2, each of the pairs of electrical leads 18 is preferably disposed in side-by-side relationship adjacent the bottom surface of a respective slot 22 in one of the commutator bars 20. Then, as shown in FIGS. 3 through 5, one of the conductive leads 28 is located in vertical alignment with and immediately over each of the pairs of the electrical leads 18; and the conductive leads 28 are trimmed in length. A heated tool 30, such as a hot staking or fusing tool, as shown in FIG. 6, is applied to the conductive leads 28 and the walls of the slots 22; and the heat of the tool 30 is transferred by the conductive leads 28 to the adjacent underlying electrical leads 18. The heat which is thus supplied to the electrical leads 18 breaks or removes the insulating covering 18a thereon and causes the formation of a mechanical and electrical connection between the electrical leads 18, the conductive leads 28, and the commutator bars 20.

Through the practice of this method, any indentation caused by the heat and the mechanical pressure of the tip of the heated tool 30 is placed upon the conductive leads 28 and not the electrical leads 18 as is conventional. Furthermore, as a result of this transfer of the tool indentation, the electrical leads 18 are not weakened during the connecting process and the possibilities of mechanical breakage or potential injury thereof are greatly reduced. Also, due to the intervention of the conductive leads 28 between the electrical leads 18 and the heated tool 30, the possibilities of a high resistance joint being formed is substantially reduced and the heat required for the connecting process is greatly lessened.

Furthermore, as was previously pointed out, the conductive leads 28 enhance the operating efficiency of the completed armature-commutator assembly by functioning as a heat sink to assist the flow of operating current through the electrical leads 18.

From the foregoing, it will be seen that I have provided new and improved means for accomplishing all of the objects and advantages of my invention.

Having thus described my invention, I claim:
1. The method of securing an insulated electrical lead to a commutator having a slot, comprising:
   (a) inserting said electrical lead into said slot without removing the insulation therefrom;
   (b) inserting a heat sink member of electrically conductive material into said slot upon said electrical lead; and
   (c) pressing a heated tool to said member of electrically conductive material until the insulation of said insulated electrical lead is broken and a good electrical and mechanical connection is formed between said electrical lead, said member of electrically conductive material, and said commutator.
2. The method of securing a pair of insulated electrical leads to a commutator having a slot, comprising:
   (a) inserting said pair of electrical leads into said slot without removing the insulation therefrom;
   (b) inserting an uninsulated member of electrically conductive material into said slot over said pair of electrical leads; and
   (c) pressing a heated tool to said member of conductive material until the insulation of said electrical leads is broken and a good electrical and mechanical connection is formed between said electrical leads and said commutator.
3. The method of securing a pair of insulated electrical leads to a commutator having a slot, comprising:
   (a) inserting said pair of electrical leads into side-by-side relation in said slot without removing the insulation therefrom;
   (b) inserting an uninsulated member of electrically conductive material into said slot in overlying relationship with said pair of electrical leads; and
   (c) pressing a heated tool to said member of electrically conductive material until the insulation of said electrical leads is broken and a good mechanical and good electrical connection is formed between said electrical leads and said commutator.
4. The method of securing a pair of insulated electrical leads to a commutator having a slot, comprising:
   (a) inserting said pair of electrical leads into side-by-side relation in said slot without removing the insulation therefrom;
   (b) inserting an uninsulated conducting member having a diameter substantially equal to the combined diameter of said pair of electrical leads into said slot over said pair of electrical leads; and
   (c) pressing a heated tool to said member of conductive material until the insulation of said electrical leads is broken and a good mechanical and good electrical connection is formed between said electrical leads and said commutator.
5. The method of securing a pair of insulated electrical leads to a commutator having a slot, comprising:
   (a) inserting said pair of electrical leads into side-by-side relation in said slot without removing the insulation therefrom;
   (b) inserting an uninsulated wire of electrically conductive material into said slot in overlying relationship with said pair of electrical leads;
   (c) trimming the length of the uninsulated wire adjacent its entry into said slot; and
   (d) pressing a heated tool to said wire of electrically conductive material and said slot until the insulation of said electrical leads is broken and a good mechanical and good electrical connection is formed between said electrical leads and said commutator.
6. The method of securing a pair of insulated electrical leads to a commutator having a slot, comprising:
   (a) inserting said pair of electrical leads into side-by-side relation in said slot without removing the insulation therefrom;
   (b) inserting an uninsulated wire of electrically conductive material into said slot in overlying relationship with said pair of electrical leads; and
   (c) pressing a heated tool to said wire of electrically conductive material and said slot until the insulation of said electrical leads is broken and a good mechanical and good electrical connection is formed between said electrical leads and said commutator.
7. The method of securing a pair of insulated electrical leads to a commutator having a slot, comprising:
   (a) inserting said pair of electrical leads into side-by-side relation in said slot without removing the insulation therefrom;
   (b) inserting an uninsulated conductive wire into said slot in overlying relationship with said pair of electrical leads; and
   (c) pressing a heated tool to said conductive wire until the insulation of said electrical leads is broken and a good mechanical and good electrical connection is formed between said electrical leads and said commutator.

8. The method of securing a pair of insulated electrical leads to a commutator having a slot, comprising:
(a) inserting said pair of electrical leads into side-by-side relation in said slot without removing the insulation therefrom;
(b) inserting a copper wire having a diameter substantially equal to the combined diameter of said pair of electrical leads into said slot over said pair of electrical leads; and
(c) pressing a heated tool to said copper wire and said slot until the insulation of said electrical leads is broken and a good mechanical and good electrical connection is formed between said electrical leads and said commutator.

References Cited

UNITED STATES PATENTS

| | | | |
|---|---|---|---|
| 2,572,956 | 10/1951 | Servis | 29—155.54 |
| 2,878,405 | 3/1959 | Merril | 310—234 |
| 3,002,259 | 10/1961 | Fletcher et al. | 29—155.5 |
| 3,156,037 | 11/1964 | Warner | 29—155.54 X |

JOHN F. CAMPBELL, *Primary Examiner.*

ROBERT W. CHURCH, *Assistant Examiner.*

U.S. Cl. X.R.

29—206, 493, 498, 597; 219—117, 53, 58; 310—234